United States Patent [19]
Andren et al.

[11] Patent Number: 5,654,991
[45] Date of Patent: Aug. 5, 1997

[54] FAST ACQUISITION BIT TIMING LOOP METHOD AND APPARATUS

[75] Inventors: Carl F. Andren, Indialantic; Leonard Victor Lucas, Palm Bay; John C. Fakatselis, Palm Bay; Jim Snell, Palm Bay, all of Fla.

[73] Assignee: Harris Corporation, Melbourne, Fla.

[21] Appl. No.: 509,588

[22] Filed: Jul. 31, 1995

[51] Int. Cl.$^6$ ............................................. H04L 7/00
[52] U.S. Cl. ............................................. 375/355
[58] Field of Search ............................ 375/355, 365, 375/367, 368, 371, 377, 208, 209, 210, 342; 370/105.3, 105.4, 506, 516

[56] References Cited

U.S. PATENT DOCUMENTS

| | | |
|---|---|---|
| 4,805,191 | 2/1989 | Burch et al. ............................ 375/355 |
| 5,402,448 | 3/1995 | Marko et al. ............................ 375/340 |
| 5,499,273 | 3/1996 | Kull et al. .............................. 375/355 |

*Primary Examiner*—Stephen Chin
*Assistant Examiner*—Kevin Kim
*Attorney, Agent, or Firm*—Roger & Killeen

[57] ABSTRACT

In a direct sequence spread spectrum receiver, an apparatus for obtaining and adjusting bit synchronization. In one aspect, the bit synchronization is adjusted by selectively inverting a clocking circuit to delay sampling by one-half a clock cycle and to combine the inversion with a skipping of one cycle to advance the sampling by one-half cycle. In another aspect of the invention, the synchronization circuit avoids overflow of accumulating components by downshifting both the partial sums and the input data when needed.

24 Claims, 4 Drawing Sheets

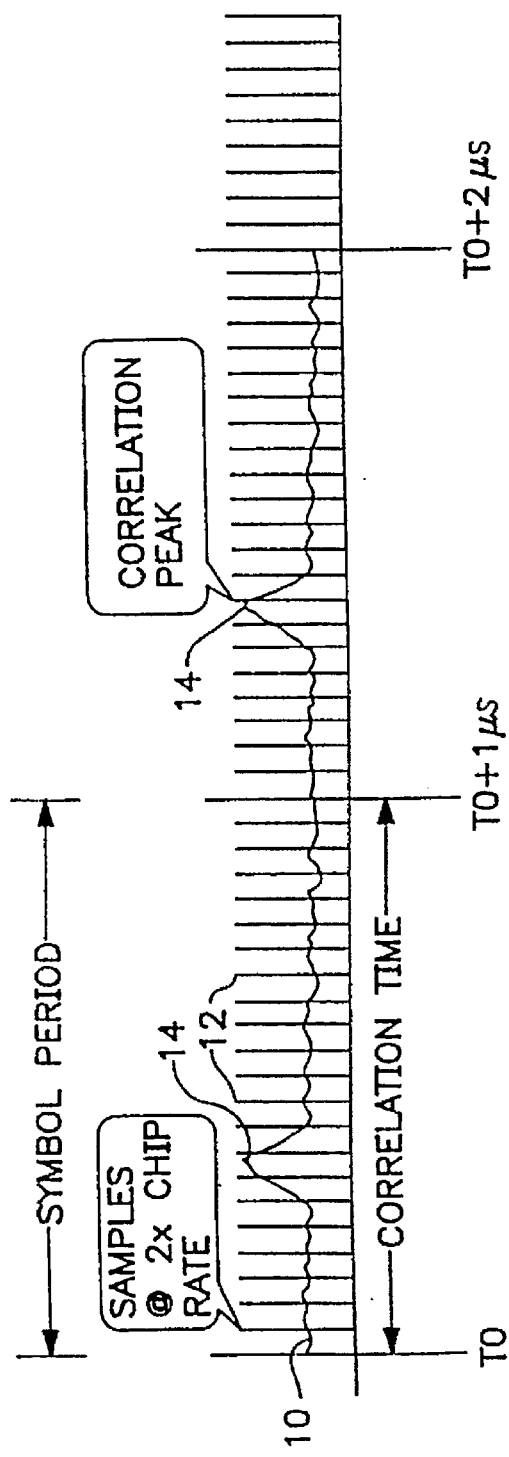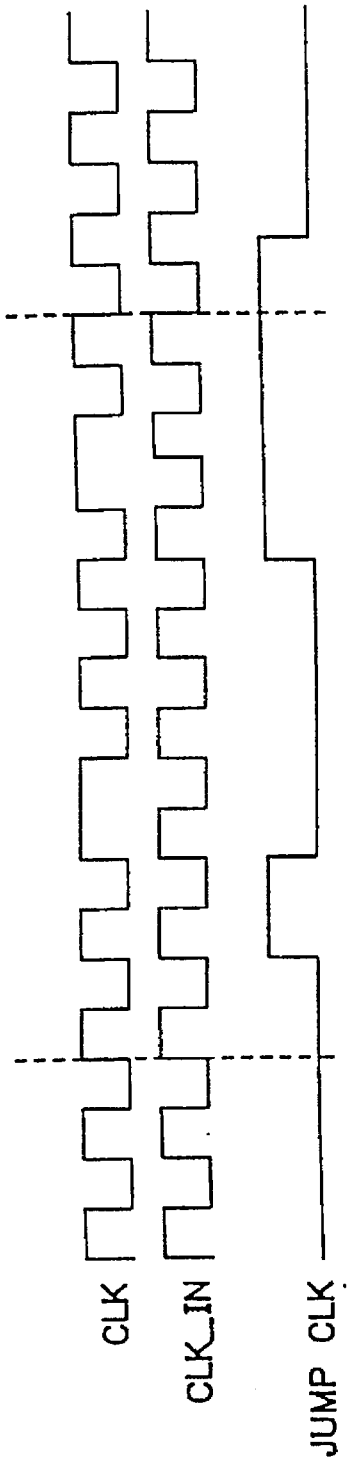

FAST ACQUISITION BIT TIMING LOOP METHOD AND APPARATUS

BACKGROUND OF THE INVENTION

This application is related to application Ser. No. 08/509,586 entitled "A Method of Estimating signal Quality for a Direct Sequence Spread Spectrum Receiver;" application Ser. No. 08/509,587 entitled "Short Burst Acquisition Circuit for Direct Sequence Spread Spectrum Links;" application Ser. No. 08/509,590 entitled "Short Burst Direct Acquisition Direct Sequence Spread Spectrum Receiver;" and application Ser. No. 08/509,589 entitled "A/D Reference Level Adjustment Circuit to Maintain an Optimum Dynamic Range at the A/D," all of which are incorporated by reference and are filed concurrently herewith and assigned to the assignee hereof.

This application is related generally to systems and methods for receiving signals having data coded therein, and in particular to systems and methods for determining and/or adjusting a clock used to extract the data from a received signal.

It is well known for signals to be transmitted in which data to be transmitted is used to modify a carrier signal. For example, digital data may be used to key a phase shift keyed modulator of a carrier frequency. Decoding of such modulated signals generally requires acquisition and tracking of the carrier frequency and demodulating of the carrier signal to return the original data signal. As is well known, the demodulating may take more than one step as the received signal may first be down converted to an intermediate frequency and subsequently demodulated to baseband. This baseband signal may then be processed in a correlator to remove an overlying spectrum spreading pseudo noise sequence. Such sequences are well known in the art and are referred to as spread spectrum. They are often applied as phase shift keyed ("PSK") modulation over the data modulation. The spreading sequence usually has a higher rate than the data modulation, often much higher. As is well known in the art, the data signal may be a series of transitions in phase or amplitude or frequency, each transition signifying the transmission of one or more portions of the data signal. For example, in a Binary Phase Shift Keyed system, the carrier signal is phase shift keyed to represent the data. In such a system sending digital data, the modulating signal causes the phase of the carrier signal to be advanced (or retarded) a predetermined number of degrees of phase to represent either a 0 or 1 binary number. In Quartary Phase Shift Keyed systems, one of four phase transitions are possible during each modulating cycle, each transition representing two bits of digital data. During each transition, or modulating signal cycle, the carrier signal contains one "symbol" which may represent one or more bits of data.

Often the modulating signal is applied to the carrier signal without regard to the phase relationship between the two signals. Thus, even when the receiver acquires the carrier signal, the receiver may not necessarily know therefrom the beginning of each symbol within the data signal. In noisy communications environments, the presence of noise on the received signal may make it difficult to determine from examining any particular symbol where the symbol begins. In prior art systems, it is known to examine plural symbols within a received signal to attempt to average the effect of noise and to thereafter remove the noise from the data signal within the noisy environment.

In order to demodulate a received signal in straightforward fashion, the receiver should know the modulation rate, i.e., how often to expect to receive a new symbol. Accordingly, the receiver may be set to generate a clock pulse the frequency of which coincides with the frequency of the modulation (or the symbol rate). This clock may be called a bit clock because it has a frequency which should match the frequency at which new symbols are received. Oftentimes, the receiver may also generate other clocks as needed from the bit clock. Merely having a bit clock, however, is generally insufficient because the bit clock must usually be synchronized with the incoming symbols. Unless the bit clock is properly synchronized, the signal may suffer relatively large losses. In the case of spread spectrum, demodulating the signal is generally possible only if the bit clock is aligned such that the signal samples being used fall somewhere on the correlation peak. Once bit synchronization can be obtained, however, the various receiver elements can be set to align the decoding circuits so that decoding and similar evaluations of the received symbols may be accomplished at the most useful time within the symbol period. (For example, the bit synchronization may be critical in determining when to use an analog-to-digital circuit to sample the magnitude of the input signal.)

In digital systems, a received signal may be sampled at a frequency greater than the Nyquist frequency and the digital samples represent the received signal. In such systems, a sequence of symbols may be represented by a sequence of samples. The sequence of digital samples may be evaluated to locate which set of the samples best coincides with an event expected within each symbol (start, end, transition, etc.). For example, and with reference to FIG. 1, a received signal 10, after correlation processing, may have the shape shown. Samples 12 of the signal are taken at a periodic rate and digitally stored and processed. For the signal of FIG. 1, peaks 14 in the signal represent the points of maximum correlation between the PN reference and the signal spreading sequence for each symbol. By examining the sample data in one or more symbols, a receiver can determine where the peaks 14 occur and adjust its decoding circuits to center the peaks within the symbol period. For the signal of FIG. 1, the peaks occur near the eighth sample, and accordingly, the eighth sample will have the maximum value. The decode circuitry can then be reset to center the symbol period appropriately.

Note that in the sampling system of FIG. 1, no sample occurred exactly at the peak. Generally speaking, it is desirable to adjust the decoding circuits so that they are decoding the signal as closely to the peak as possible. Accordingly, the prior art has developed many different methods for centering the peaks. In one prior art scheme, a voltage controlled oscillator is used to adjust the phase of the A-to-D sampling to match the detected peaks. Such a scheme has achieved some success in obtaining fine resolution of the phase but generally requires costly analog components. Another prior art scheme oversampled the A-to-D input and used the closest of these oversamples. Such a scheme generally requires very fast, relatively expensive and high power consumption A-to-D devices. Still another prior art scheme uses digitally programmable delay lines to time shift the sampling clock or input signal. Such a scheme generally required relatively expensive and large components to implement.

Accordingly, it is an object of the present invention to provide a novel method and apparatus of acquiring bit synchronization while minimizing additional circuitry and power consumption.

It is another object of the present invention to provide a novel method and apparatus to acquire bit synchronization with a reduced number of circuit components and complexity when compared to some prior art bit synchronization schemes.

It is still another object of the present invention to provide a novel method and apparatus for demodulating and decoding phase shift keyed signals without a relatively high speed A-to-D device to adjust bit synchronization.

These and many other objects and advantages of the present invention will be readily apparent to one skilled in the art to which the invention pertains from a perusal of the claims, the appended drawings, and the following detailed description of the preferred embodiments.

BRIEF DESCRIPTION OF THE DRAWINGS

FIG. 1 is a pictorial diagram illustrating a typical signal received from a correlator in a system of the present invention;

FIG. 3 is a pictorial diagram illustrating the various clock signals which may be used in one aspect of the present invention;

DESCRIPTION OF PREFERRED EMBODIMENTS

It is well known in the prior art to use pseudorandom noise ("PN") to generate a code by which signals to be transmitted are spread across a spectrum. When such signals are received, the PN code is again used to extract the data from the encoded carrier. The present invention finds particular usefulness in the demodulating and decoding of such spread spectrum signals, and particularly in the digital processing thereof. However, the present invention can be used in other types of systems in which a digitized signal is correlated and examined to determine a bit rate and/or synchronization.

With reference to FIG. 1, it is well known to process a received spread signal digitally. During such processing, one typical step is to correlate the PN code against the received signal to develop a correlated signal 10. The correlated signal 10 indicates the locations along the received signal where the data signals are present. The correlation process produces a correlated signal in which triangular peaks 14 occur at the data locations. Generally, the higher the peak within the signal, the better the correlation between the received signal and the PN code. When messages are transmitted in the form of plural, periodic symbols modulated onto a carrier signal, a series of peaks 14 will be output from the correlator at the frequency of the modulating signal. The task of the bit synchronization circuit is to identify the locations of the peak and to adjust the decoding and demodulating circuits to the extent possible to perform their decoding/demodulating functions as near to the center of the peaks as possible, within the cost, size, and power constraints applicable to a particular receiving system.

In a digital receiving system, the output of the correlator circuit may be digitized at a periodic rate greater than the bit rate. For example, in the system shown in FIG. 1, each symbol period is sampled twenty-two times to produce twenty-two samples per symbol. By comparing the magnitudes of the digital correlation samples 12, a receiving system can determine that the symbols are best decoded with respect to a particular sample within each symbol period. So long as the symbol clock of the receiving system matches the symbol clock of the transmitting system, the location of the sample within each symbol which has the highest correlation value will remain the same over plural symbols. (Clock drift or noise may eventually cause the location of the sample having the highest value to drift or change within a particular message).

Figure 2:
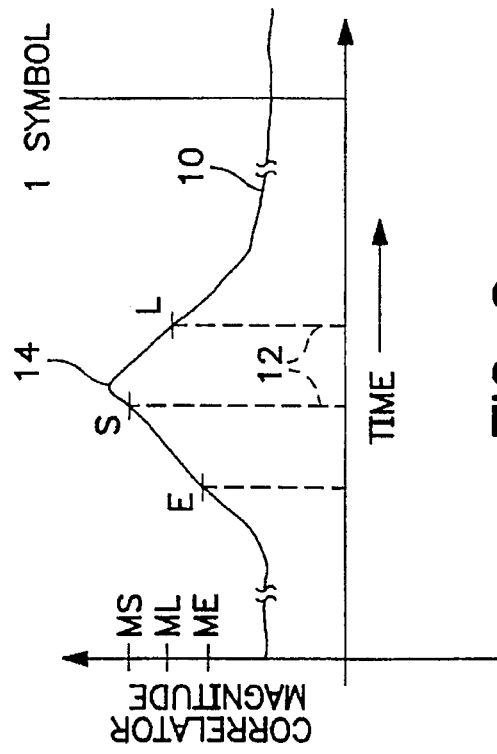
FIG. 2 is a pictorial diagram illustrating a portion of the signal of FIG. 1 in greater detail.

With reference to FIG. 2, the sampling of the correlator signal 10 is depicted in greater detail at and near the peak 14 of the signal. Note that no sample 12 occurs exactly at the peak correlation magnitude. The sample having the highest correlation magnitude is the S sample; the sample immediately earlier than the S sample is designated as the E sample (or early sample); and, the sample immediately after the highest sample is designated the L sample (or late sample). If the S sample had occurred exactly at the peak of the correlation signal, the sample (or bit) clock is aligned exactly with the received signal. In this situation, the magnitudes of the early sample and the late sample would be expected to be nearly equal and be nearly 50% of the magnitude of the S sample. As depicted in FIG. 2, however, the S sample is not taken at exactly the point of highest correlation and the early and late samples are not equal to each other. In one aspect of the present invention, this relationship among the early, largest and late samples may be used to adjust the bit synchronization with respect to the symbol timing of the received signal.

In another aspect of the present invention, the bit synchronization ("sync") clock used to clock the symbol decode and demodulate circuits may be simply adjusted to bring into better alignment the receiver bit clock and the symbols in the received signal. It is known in the art to use a periodic signal such as a sinusoid or square wave to drive the devices, such as the A/D converters which sample the received signal or signals derived therefrom, such as a correlation signal. In such prior art devices, the sampling circuit may be built such that a sample is taken upon the occurrence (a rising edge, a falling edge, etc.) of the bit clock. For example, and with reference again to FIG. 1, the bit clock can be operated at a frequency such that the rising edges of the bit clock occur, and drive the synchronization circuits, at a rising edge of the system clock.

In one aspect of the present invention, the bit clock can be made to better coincide with the received symbol clocking by selectively inverting the bit clock (to delay one-half cycle of the clock) and/or by selectively inverting and skipping one cycle of the clock (to advance the clock by one-half cycle). With reference now to FIG. 3, a receiver may use conventional means to generate a clocking signal which produces a clock signal of a desired frequency (the expected frequency of the symbols). In the signals of FIG. 3, the signal labelled CLK_IN is such a signal. The CLK_IN signal is used by appropriate circuitry to produce a signal CLK (a bit sync clock) which may be used to drive the decode and demodulation circuits. If it is determined by the receiver that a delay of one-half cycle in the clock signal is desirable to align the bit sync clock with the symbols of the received signal, such a delay can be accomplished by selectively inverting the CLK signal. For example, and with continued reference to FIG. 3, if a signal JUMPCLK is received, indicating that the CLK should be inverted, a selectively operated inversion device can be placed between the CLK_IN signal and the CLK signal derived therefrom to invert the CLK signal. As seen in FIG. 3, when the CLK signal is so inverted, its rising edges are thereafter delayed one-half cycle from when they otherwise would have occurred. At another selective time, the CLK signal may be again inverted to again delay the CLK signal by one half-cycle. If the circuit determines that a one-half cycle advance of the CLK signal is needed, an entire cycle of the CLK signal can be skipped and the signal inverted to effectively advance the CLK signal by one-half cycle. The advancement of the CLK circuit can readily be performed by appropriate circuits in the CLK generating circuit or by circuit elements which use the CLK signal.

Figure 4:
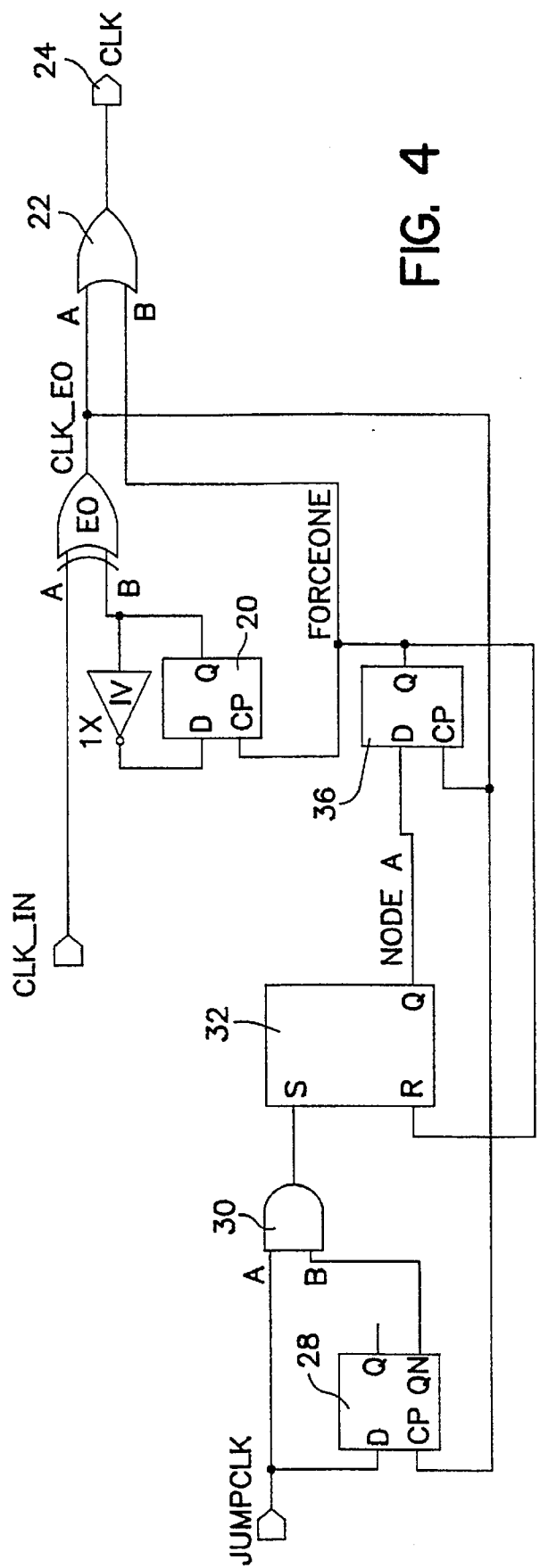
FIG. 4 is a simplified circuit diagram showing a circuit which may be used in an embodiment of one aspect of the present invention.

With reference to FIG. 4, a circuit which can be used to delay the CLK circuit by one-half cycle may include an Exclusive-OR gate EO which receives a CLK_IN signal and a signal from a first D-Q flip-flop 20. The CLK_IN signal may be a periodic signal, such as the square wave signal referenced as CLK_IN of FIG. 3. The EO Exclusive-OR gate produces a signal CLK_EO which is applied to one input gate of a first OR gate 22. The other input into the first OR gate 22 is tied to the clock input of the first D-Q flip-flop 20. In the circuit of FIG. 4, the output signal 24 is taken at the output of the first OR gate 22.

With continued reference to FIG. 4, a signal indicating when the output clock signal is to be inverted may be received at a circuit input JUMPCLK. The JUMPCLK signal is applied to the D lead of a second D-Q flip-flop 28 and to one of the inputs of an AND gate 30. The second D-Q flip-flop 28 is clocked by the CLK-EO signal. The output signal from the first D-Q flip-flop 20 is provided to the second input of the AND gate 30. The output of the AND gate 30 is provided to a SR latch 32 which has its output tied to a third D-Q flip-flop 36. The output signal from the third D-Q flip-flop 36 is tied back to the input of the S-R gate 32 and is also provided to the clock lead of the first D-Q flip-flop 20. The output signal from the third D-Q flip-flop 36 is used to clock the first D-Q flip-flop 20, as a second input signal to the first OR gate 22, and as the second input to the SR latch 32.

In operation, a CLK_IN signal may be provided to the first input of the Exclusive OR gate EO. SO long as the other input of the Exclusive OR gate EO remains low, the periodic signal of the CLK_IN signal is passed through to the first OR gate 22, and ultimately, assuming a zero input on the other input to the first OR gate 22, the CLK-IN signal is passed out of the circuit as the CLK signal 24. When an external circuit determines that it is appropriate to invert the CLK signal to cause an effective delay of one-half cycle in the decoding/demodulating circuits, a pulse signal may be provided on the JUMPCLK signal. Note that the length of the pulse is not significant as only the leading (rising) edge of the JUMPCLK signal affects the circuit of FIG. 4. When a rising edge occurs on the JUMPCLK signal, the logic level at NODE A also goes high. Then, upon the next rising edge of the CLK-EO signal (which clocks the third D-Q flip-flop 36), the signal FORCEONE activates, holding the CLK signal high. The FORCEONE signal also toggles the first D-Q flip-flop 20, effectively inverting the CLK-IN signal. The FORCEONE signal also resets the SR latch, forcing Node A low. On the next rising edge of CLK-EO, the FORCEONE signal goes low for "normal" operation, permitting the CLK-EO signal to be passed through the first OR gate 22. In this way, a circuit of the present invention causes a graceful inversion of the CLK signal upon receipt of a rising edge on the JUMPCLK line and causes a second inversion (to the original phase relationship) upon receipt of a second rising edge on the JUMPCLK line. Appropriate reset inputs to the gates in the circuit of FIG. 4 may be used to obtain a known initial condition upon reinitialization of the circuit.

The clock inversion function of the present invention may be carried out by any suitable circuit and the circuit of FIG. 4 is but one of many possible implementations of the clock inversion functions which will occur to persons skilled in the art. The circuit of FIG. 4, like all of the circuits in the present application, is illustrative of one embodiment which can be used to carry out the principles of the invention disclosed herein and the invention is in no way limited to the specific circuits shown herein.

Figure 5:
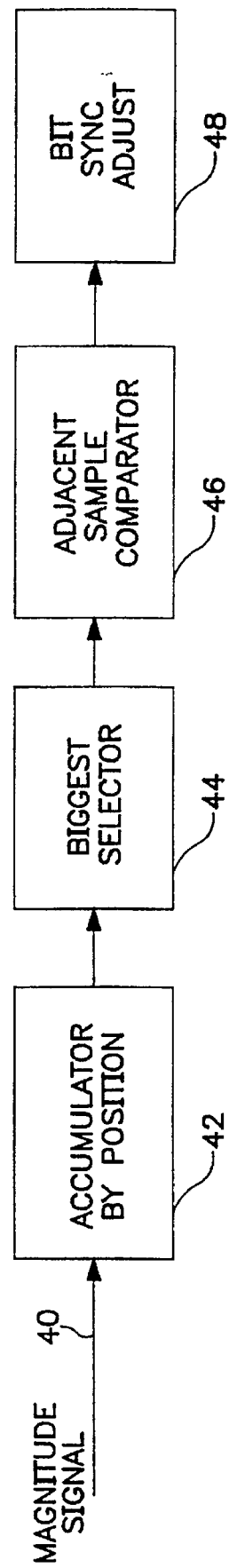
FIG. 5 is a simplified block diagram showing an embodiment of another aspect of the present invention; and, FIG. 6 is a simplified functional block diagram of a circuit which may be used as one embodiment of one aspect of the present invention.

As described in detail below, the bit sync clock adjustment circuit of FIG. 4 may be used along with suitable other circuits to determine the samples within a series of sampled symbols at which decoding should be accomplished and to adjust the bit synchronization of the decoding and demodulating circuits to better center the sampling near the received peak of the symbol. With reference to FIG. 5, a functional block diagram of a system which could be used to adjust the bit synchronization may receive a signal which provides a time series of magnitudes associated with each sample of a received signal. The magnitude signal may be provided to an accumulator 42 which sums the magnitudes associated with each sample position within a symbol. For example, the accumulator may sum all the first samples (within each symbol) together, all the second samples together, etc. for a predetermined period of time. The period of time over which the samples are accumulated may be a function of the duration of the preamble or a portion of a preamble of the received signal. Upon the end of the selected period of time, the sums are evaluated by a biggest selector 44 which compares the accumulated sums and determines which set of samples contains the highest sum. The set of samples having the biggest sum and the adjacent samples (i.e., the early and late samples) are then passed to an adjacent sample comparator 46 which determines the extent to which the selected biggest set of samples are centered in the peak of the received signal and whether an adjustment in the bit sync clock is desirable. If an adjustment in the bit synch clock is desirable, signals indicating that fact and the direction of the adjustment (earlier or later) may be sent to a bit synch adjust circuit 48 which adjusts the bit synch clock with respect to the received signal. The bit synch adjust circuit 48 may include a circuit such as depicted in FIG. 4 to adjust the bit synch clock.

In operation, the adjacent sample comparator 46 may evaluate the biggest set of samples and the adjacent sets of samples to determine if and how much bit synch adjustment may be desirable. In one embodiment, the adjacent sample comparator may look at the magnitudes of the adjacent sets of samples in relation to the magnitude of the biggest set of samples. For example, the comparator could compare the summed magnitudes and if either of the adjacent samples magnitudes exceeds a threshold, the bit synch clock can be adjusted to move the bit synch clock one half-cycle between the biggest set of samples and the next biggest magnitude samples. In one embodiment, the inventors have determined that the comparator circuit works appropriately when the comparator compares the magnitude of the adjacent set of samples to determine whether either adjacent set has a total magnitude at or exceeding seventy-five percent (75%) of the magnitude of the biggest set of samples.

Figure 6:
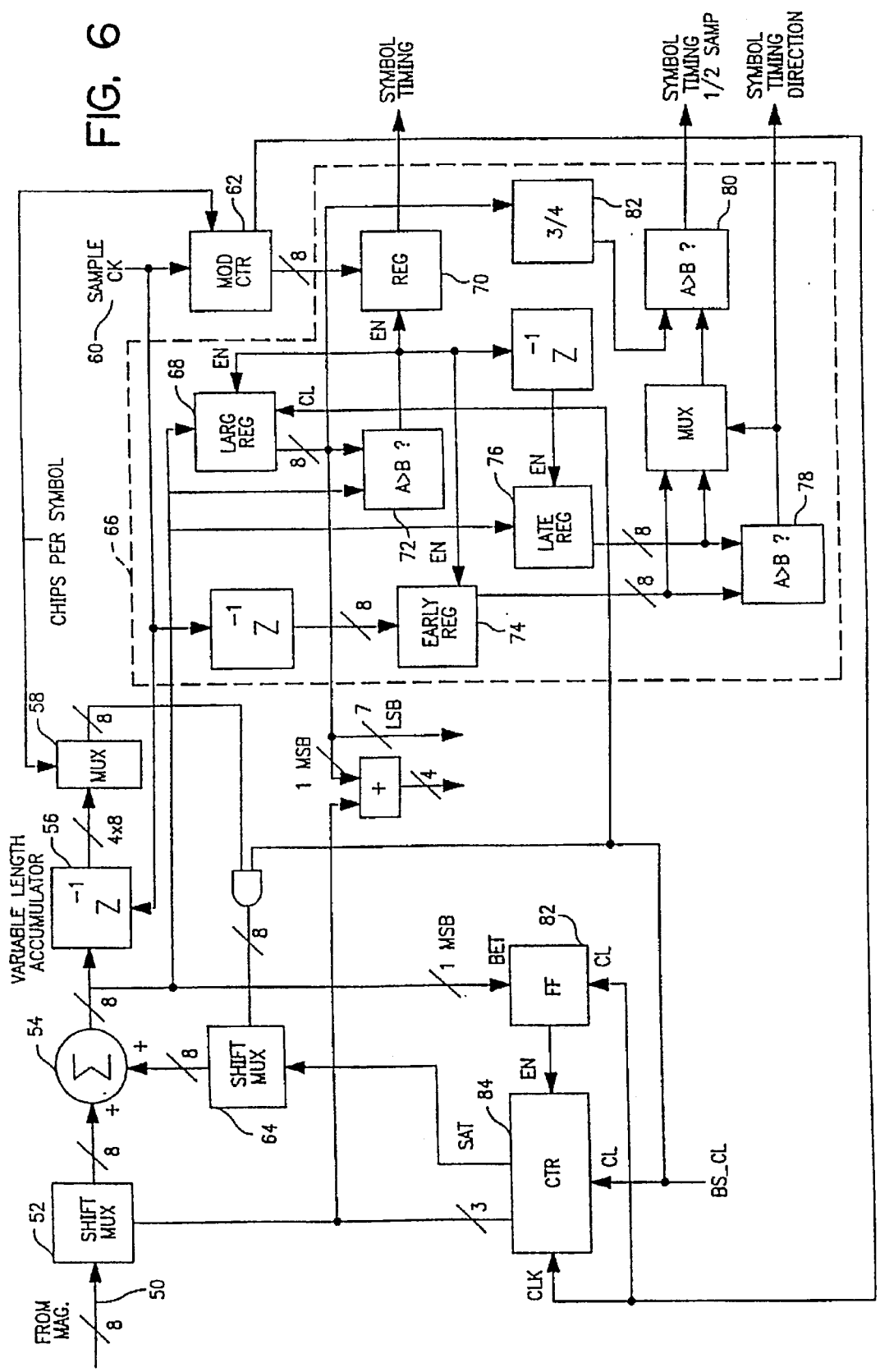

With reference now to FIG. 6, one embodiment of a circuit which can carry out the bit clock synchronization portion of the present invention may receive an input signal 50 indicating the magnitude of samples of the received signal (or of correlations between the received signal and a PN code) which may be applied to a shifting multiplexer 52. The output of the shifting multiplexer 52 may be applied in turn to a summer 54, a variable length accumulator 56 and a multiplexer 58. The multiplexer 58 may be set to operate based on the number of chips (or samples) per symbol within the received signal. A sample clock signal 60, operating at the frequency of the sampling, may be used to provide a clocking signal to the variable length accumulator and to a modulo counter 62 which repeatedly counts from one to the number of samples per symbol, i.e., the modulo counter 62 identifies the position of each sample within a symbol. A second shifting multiplexer 64 also feeds the summer 54 to accumulate the magnitude associated with each sample position within a symbol, as described below.

At the end of a predetermined period during which the bit synch is being evaluated (for example at the completion of an antenna dwell or a specified portion of a message preamble), the results from the variable length accumulator are read into a biggest picker circuit 66. The biggest picker circuit 66 includes a largest register used to hold the largest sum of magnitudes value received from the variable length accumulator. A corresponding register 70 holds the position (or timing) within the symbols of the sample having the largest magnitude sum. Each time that a magnitude sample is received from the accumulator, it is compared in a first comparator 72 against the previously stored largest value in the largest register 68. If the newly arriving value is larger, the stored value in the largest register 70 is replaced with the new value and the adjacent samples are saved in an early register 74 and a late register 76. Thus, at the completion of the evaluation period, the biggest picker 66 will have within its circuits the largest value sample, the values of the adjacent samples, and the position or timing of the largest value. Thereupon, the two adjacent values may be compared first with each other in a second comparator 78 to determine which sample is larger and then the larger of the two adjacent samples is compared in a third comparator against a scaled value of the largest sample. The scaling of the largest sample is accomplished in a scaler 82 which may be set, for example, to 0.75 to compare the adjacent sample against 75% of the largest sample.

Note that at the completion of the evaluation period, the timing of the sample having the largest cumulative value is already in the corresponding register 70 and may be made available (through the SYMBOL TIMING signal) to other elements within the receiver for decoding and demodulating the symbols.

In operation, when the circuit of FIG. 6 determines that magnitude of the sums of the adjacent sample exceeds the scaled value of the largest sum of magnitudes, a signal is sent to the bit synch circuit to adjust the bit synch timing by one-half sample (SYMBOL TIMING ½ SAMP) and the direction (early or late) in which to adjust the bit synch timing (SYMBOL TIMING DIRECTION). To adjust the bit synch clock by one-half cycles, the main sample clock may be inverted as discussed earlier with regard to FIG. 4. If a timing advance of one-half cycle is desired, the clock may be inverted, as explained previously, and the timing decode circuits may be advanced by an entire clock cycle. This technique advances the symbol interval by one-half clock cycle without requiring any circuit to run at twice speed.

With continued reference to FIG. 6, a circuit in accordance to another aspect of the present invention may also include circuit components which are operable over a wide range of input signal strength conditions and without adding complex and relatively expensive circuitry to handle magnitude buildup and overflow within the bit sync circuits. Generally, magnitude values are considered unsigned numbers, and summing such numbers usually requires the summing and subsequent devices which use such sums to contain many more bits than the input signals. For example, in the exemplary system of FIG. 6, the magnitude signals contain up to eights bits of value. If two such magnitude values are added, the sum of the values may overflow an eight bit register. Accordingly, and in conventional magnitude comparing circuits, the accumulator and many other devices must be more than eight bits in width or the selection of the biggest sum of magnitudes will be erroneous. In one aspect of the present invention, overflow is avoided yet additional circuitry to widen the bit width of the accumulator and downstream circuits is not required. To avoid the overflow, after each magnitude is added to the running total of each sample, the most significant bit of the total is checked to determine whether it is set by a flip-flop 82. If the bit is set, the flip-flop is used to enable a counter 84 which tracks the number of times that the magnitude has been shifted within the evaluation period. The counter 84 also causes the two shifting multiplexers 52 and 64 to right shift their contents using a barrel shift. Thus, all of the samples are scaled equally and both the stored partial magnitude sums and the input values are scaled in a corresponding manner. By using this circuit, signals having a relatively large strength (and correspondingly large correlation magnitudes) will not overflow the accumulator and both the stored values and the input values will be shifted in a coordinated manner. On the other hand, for signals having low magnitudes scaling, and its usual lose of precision, may be avoided.

In a typical operation of the circuit of FIG. 6, the magnitude values 50 output from a correlator may be accumulated for fourteen symbols. The accumulator and the various counters may previously have been be cleared (by the BS-CL) signal at the beginning of an evaluation interval. The accumulator length (i.e., the number of samples which can be processed in parallel) may, if desired, be set to correspond to the number of samples per symbol by use of the mux 58 which can be selected from one of a predefined set of available selections. By use of the counter 84 and the barrel shifting of the shift muxes 52 and 64 the sum in the accumulator is made to use as many of the full eight bits as possible without causing overflow.

While preferred embodiments of the present invention have been described, it is to be understood that the embodiments described are illustrative only and the scope of the invention is to be defined solely by the appended claims when accorded a full range of equivalence, many variations and modifications naturally occurring to those of skill in the art from a perusal hereof.

What is claimed is:

1. A circuit for acquiring the bit synchronization of a signal having plural symbols contained therein, comprising:
   (a) means for obtaining N samples of each of said symbols;
   (b) means for determining the magnitude of each of said samples;
   (c) means for obtaining the sum of the magnitudes of the i th samples of each of said symbols, i ranging from 1 to N, over a predetermined time period;
   (d) means for determining the largest of said sums of the magnitudes;

(e) means for comparing said largest sum of magnitudes with the sums of magnitudes of the immediately adjacent samples;

(f) means for adjusting the bit synchronization responsive to said means for comparing.

2. The circuit of claim 1 wherein said means for obtaining the sum comprises means for avoiding overflow of the sum of the magnitudes.

3. The circuit of claim 2 wherein said means for avoiding overflow comprises:

(a) means for detecting when one of the sums of magnitudes exceeds a predetermined threshold;

(b) means for reducing said one sum of magnitudes exceeding the predetermined threshold;

(c) means for reducing the magnitude of additional magnitudes applied to said one sum of magnitudes exceeding the predetermined threshold; and, (d) means for recording the number of times said means for reducing is applied to reduce said one sums of magnitudes exceeding the predetermined threshold.

4. The circuit of claim 3 wherein said means for reducing said one sum comprises means for right shifting said one sum of magnitudes exceeding the predetermined threshold.

5. The circuit of claim 3 wherein said means for recording comprises a register which is incremented each time said means for reducing is applied to said one sum of magnitudes exceeding the predetermined threshold.

6. The circuit of claim 1 wherein said bit synchronization is adjusted when the sum of magnitudes of one of said adjacent samples exceeds a predetermined proportion of the magnitude of said largest sum of magnitudes.

7. The circuit of claim 6 wherein said predetermined proportion is about 75 percent.

8. The circuit of claim 1 wherein the bit synchronization is adjusted by selectively inverting the bit sync clock.

9. The circuit of claim 1 wherein the bit synchronization is adjusted by selectively skipping one cycle of the bit sync clock.

10. The circuit of claim 1 wherein said signal is a signal output from a correlator circuit correlating a received signal with a PN pattern.

11. A method for acquiring bit timing in a received signal comprising the steps of:

(a) providing a receive clock which produces a periodic signal at a first predetermined rate;

(b) dividing the periodic signal by a predetermined integer factor to produce a second periodic signal;

(c) selectively inverting the second periodic signal to synchronize the second periodic signal to the bit rate of the received signal; and (d) using the second periodic signal to decode the bit timing of the received signal.

12. The method of claim 11 further comprising the step of:

(c1) selectively eliminating a cycle of said second periodic signal to synchronize the second periodic signal to the bit rate of the received signal.

13. In a signal processing system for a signal having plural symbols within a predetermined interval of time, a system for synchronizing the decoding of the symbols comprising:

sampling means for taking N samples of each symbol;

correlation means for determining the correlation of the signal with a decoding signal and providing a correlation magnitude;

accumulation means for accumulating the correlation magnitude associated with the i th sample of each symbol within the predetermined period, i ranging from 1 to N;

shifting means for shifting the correlation magnitude when a predetermined threshold is reached;

second shifting means for shifting the accumulations associated with each of the i th samples; and, means for identifying the sample having the largest accumulated value over the predetermined time interval.

14. The system of claim 13 wherein said decoding signal comprises a PN pattern.

15. In a system in which plural symbols are communicated over a period of time and in which N samples of each of said symbols are taken, a system for determining which of said N samples are to be used to decode said symbols comprising:

means for determining a magnitude of each of said N samples;

means for accumulating the magnitudes for the ith sample within each symbol, i ranging from 1 to N;

means for selectively reducing the sensitivity of said accumulating means;

means for selectively reducing the magnitudes accumulated by the accumulating means; and means for determining which of the N samples accumulates the largest magnitudes.

16. The system of claim 15 wherein said means for selectively reducing the sensitivity comprise shifting means to barrel shift the magnitudes accumulated in said means for accumulating.

17. The system of claim 16 further comprising counter means for determining the number of shifts experienced by said shifting means.

18. The system of claim 15 wherein said means for selectively reducing the sensitivity is operated upon the accumulation of a predetermined magnitude in said means for accumulating.

19. The system of claim 15 wherein said means for selectively reducing the sensitivity is operated upon the appearance of a predetermined bit in a predetermined position within said means for accumulating.

20. The system of claim 13 wherein said magnitude is a magnitude of a signal output from a correlator circuit correlating a received signal with a PN pattern.

21. A method for acquiring bit timing in a received signal comprising the steps of:

(a) providing a receive clock which produces a periodic signal at a first predetermined rate;

(b) dividing the periodic signal by a predetermined integer factor to produce a second periodic signal;

(c) selectively eliminating a cycle of said second periodic signal to synchronize the second periodic signal to the bit rate of the received signal; and (d) using the second periodic signal to decode the bit timing of the received signal.

22. The method of claim 21 further comprising the step of selectively adjusting said second periodic signal by one half cycle to synchronize the second periodic signal to the bit rate of the received signal.

23. The method of claim 22 wherein the step of selectively adjusting said second periodic signal by one half cycle comprises the step of retarding said second periodic signal.

24. The method of claim 22 wherein the step of selectively adjusting said second periodic signal by one half cycle comprises the step of advancing said second periodic signal.

* * * * *